April 18, 1933.  E. H. KOCHER  1,903,819
PIPE FITTING
Filed June 16, 1925
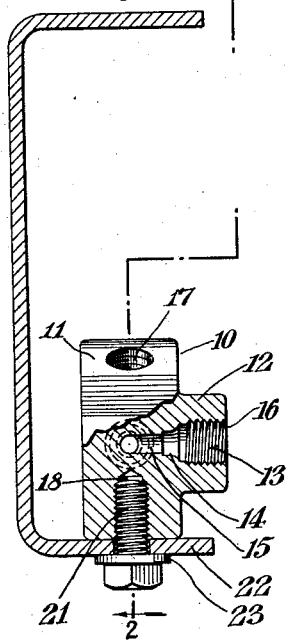
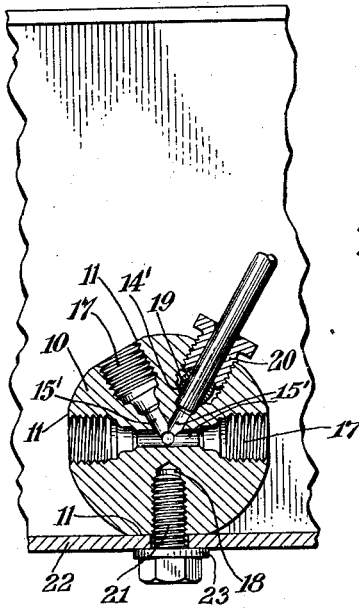
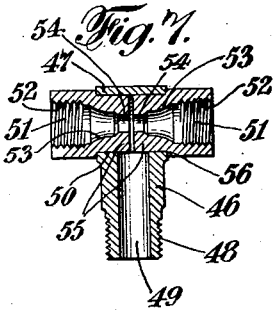
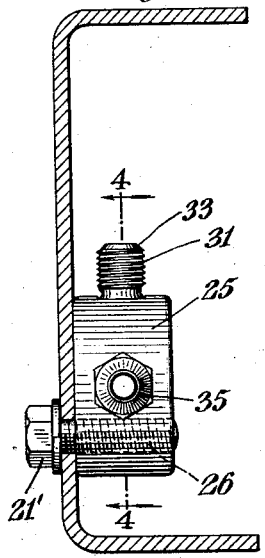
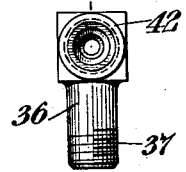
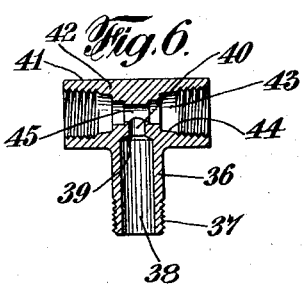
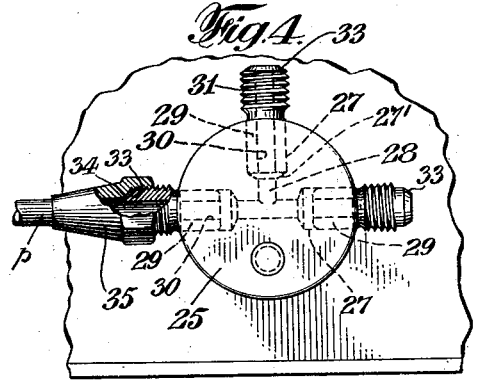
Inventor
Edward H. Kocher
By his Attorneys
Dean, Fairbank, Obright & Hirsch Patented Apr. 18, 1933

1,903,819

UNITED STATES PATENT OFFICE

EDWARD H. KOCHER, OF NEW YORK, N. Y., ASSIGNOR TO AUTO RESEARCH CORPORATION, A CORPORATION OF DELAWARE

PIPE FITTING

Application filed June 16, 1925. Serial No. 37,435.

My present invention relates primarily to the dividing or junction fittings of piping installations, and has a desirable application to automotive chassis lubrication.

An object of the invention is to provide junction fittings in which, without the need for special precautions, large amounts of waste encountered in machining shall be wholly obviated, and which shall not be subject to cracking or breaking during machining or installation or to leak in use, and which shall be tough and homogeneous throughout.

Another object is to provide junction fittings of the type mentioned, which shall be devoid of any relatively weakened protrusions, likely to be broken off and which shall yet lend itself readily to convenient and secure application to the supporting or frame structure on which the piping system is to be installed.

Another object is to provide a unit which may be readily adapted without the need for expensive operations, for any of a wide variety of applications, as for instance, for accommodating different numbers and arrangements of branch pipes.

In the accompanying drawing in which are shown one or more of various possible embodiments of the several features of the invention, Fig. 1 is a side elevation partly broken away of one form of junction fitting installed in place, Fig. 2 is a sectional view taken along the line 2—2 of Fig. 1, Fig. 3 is a view similar to Fig. 1 of a modified form, Fig. 4 is an elevation of Fig. 3, Fig. 5 is an elevation of a form of T fitting, Fig. 6 is a sectional view taken along the line 6—6 of Fig. 5, and;

Fig. 7 is a sectional view similar to Fig. 6 of another form of T fitting.

As conducive to a clear understanding of the objects and purpose of the invention, it may be noted that brass castings while inherently more expensive than iron may, nevertheless, be preferable since they are not subject to rusting, and are, moreover more readily trimmed and machined which effects economies that in part offsets the added cost of the material. Sand castings generally, are open to the objection that they frequently are porous or spongy and consequently subject to leakage. Die castings, on the other hand, may be too weak and too brittle for use as dividing fittings and are, moreover, relatively expensive.

In one form of my invention, to be now described, the dividing fittings are made of bar stock which is relatively inexpensive, free from pores or blow holes, and may be run through automatic screw machines, operating from only one side of the stock, and, accordingly requiring no chucking. The blank thus produced may be conveniently drilled and tapped to form a finished fitting with the desired number of branches.

The junction or dividing fitting shown in Figs. 1 and 2 comprises a blank 10 of bar steel, for instance, generally circular in cross-section, though brass or other suitable metal forms may be used. For producing the fitting, the length of bar stock is operated on by an automatic screw machine (not shown) cutting away the metal at the end to form an axial hub 12, whereupon the socket 13 is bored in the hub, the rounded shoulder 14 is cut, the bore 15 of reduced diameter is drilled through toward the center of the blank and the socket 13 is tapped at 16. The blank is finally cut off along its flat face by the operation of the screw machine.

The individual fitting blanks may then be tapped and bored radially as at 17 in accordance with requirements, which operation is effected quite simply in a drill press with tapping attachment (not shown), the tapped opening 16 in the hub serving preferably for convenient mounting of the blank in the holding jig or fixture. Each of the radiating sockets is formed of the same construction as axial socket 13 and the reduced inner bores 15' all communicate with each other and with bore 15 of the axial socket at the center of the fitting, as shown. Preferably, the drilling operation is performed concurrently with a spot facing operation, to produce the flats 11 at the outer ends of the sockets 17. The drilling and tapping instrumentality is also employed preferably to drill and tap the mounting bore 18 which terminates short of the center of the fitting.

In the embodiment of Figs. 1 and 2, four radial terminal sockets are shown so that the fitting with the hub socket 13 has five pipe terminals. It follows, accordingly, that an inlet pipe applied to any one of the terminals can be made to supply four branch pipes mounted at the other four terminals. Of course, if only three branches are required, the stock would be bored at only four instead of at five places, if two are required at only three places, etc. the periphery of the blank being left undrilled at the places at which no pipes are to be connected. The terminal sockets indicated, are applicable more particularly for attachment of the pipe ends by means of compression couplings. The conventional form of coupling shown applied at one of the sockets comprises a metallic sleeve 19, one beveled end of which contacts the curved shoulder 14', and a threaded bushing 20 encircling the pipe is threaded into the socket and its inner shoulder presses upon the other beveled end of the compression coupling sleeve 19 and forces the metal thereof inward to clasp the pipe therethrough, both at the fitting and at the bushing end thereof.

As suggested in Fig. 1, the dividing fitting would be applied to the mounting or suspending structure or frame on which the installation is supported, for instance, on the channel frame of a motor vehicle, by means of a threaded cap screw 21 passed upward from below the lower flange 22 of such frame and secured in position as by a lock washer 23 and threaded into the mounting socket 18 on the fitting. It is preferred in effecting the installation to insert the cap screw partly upward above mounting flange 22, then to center the mounting socket 18 thereover and thereupon while holding the fitting firmly, to extend in any desired plane in accordance with requirements, the screw is threaded inward to home and locking position.

While I have shown an embodiment with an axial hub 12 providing one of the pipe terminals, it will be understood that this lug could be omitted and the fitting provided with merely radial or generally radially extending terminals. It will also be understood, of course, that the hub socket could, if desired, be formed as a socket for mounting the fitting rather than as a pipe terminal socket and in that case, the socket would, of course, substantially as bore 18, terminate short of the pipe terminal bore 15.

It will thus be seen that I have provided a flow control fitting which can be made by an automatic screw machine from inexpensive bar stock or other similar materials, in the form of a blank or slug, and which is universal in the sense that by simple operations on a drill press, one and the same blank can be formed to provide any desired number of outlets according to requirements within the limits permitted by the cross-section of the slug used to make the fitting. The fitting avoids the waste incurred where castings are employed and the porosity of such castings and is also tough and of uniform texture.

In Figs. 3 and 4 is shown an alternative embodiment of flow dividing fitting on a generally similar principle. This embodiment involves the use of circular bar stock of substantially smaller diameter than that used for the embodiment of Figs. 1 and 2, separate nipples being radially fixed therein to provide the pipe terminals. I have illustratively shown this embodiment with three terminals, that is, as a T fitting. Specifically, a thick circular blank 25 is bored and tapped as at 26 through the thickness and near the periphery thereof and then cut off from the length of stock. The blank is then drilled as in a drill press with radial bores 27 of larger diameter near the exterior and coaxial bores 28 of smaller diameter near the center of the blank where said latter bores intersect. The nipple elements have shanks 29 cylindrically bored as at 30 and press-fitted into the bores 27 of the disk to abut the shoulders 27' at the inner ends of bores 27. The pipe terminals in this case may be of conventional flared type, the end of the nipple being beveled as at 33 and the correspondingly flared end 34 of the soft metal pipe $p$ to be coupled abutting thereagainst and being pressed into firm contact therewith by an encircling elongated nut 35 engaging the same.

The fitting may be mounted with one of its faces pressed against the supporting frame, a cap screw 21' similar to that shown in Figs. 1 and 2 being employed and coacting with bore 26. The blank 25 is of greater thickness than the diameter of nipples 31 or of nuts 35, so that no obstruction is encountered in tightening or loosening the nuts with respect to the previously installed dividing fitting.

In Figs. 5 and 6 is shown another embodiment of the invention, more particularly a T fitting adapted to mount a flow control unit in its path. The fitting in this embodiment is machined in a unitary piece from flat bar stock. For this purpose, an automatic screw machine cuts away the material to form the mounting nipple or post 36 to thread it at its exterior as at 37 and to provide a cylindrical bore 38 therein with a beveled shoulder 39 at the inner end thereof which leads to a short bore 40 of reduced diameter therebeyond. The metal is then cut off at the edge 41 to provide a generally rectangular head or cross bar 42. The head may then be drilled and tapped as at 43 from opposite ends, formed with beveled shoulders 44 and bored through as at 45, the post 36 serving for holding the fitting for these operations. The terminals, in this embodiment, are compression couplings (not shown) preferably similar to that shown in Fig. 2.

While the T fitting shown may be used as a simple dividing or junction fitting, the cylindrical bore 38 lends itself particularly for mounting a restriction flow control fitting (not shown) which may be of the type shown in my copending application, Serial No. 18,092, filed March 25, 1925, in which application also, is disclosed the fitting of Figs. 5 and 6.

In Fig. 7 is shown another embodiment of T fitting which is preferred from a number of aspects. The fitting is formed of three pieces of short bar stock of much smaller gauge than for the other embodiments. The post 46 is formed on an automatic screw machine from square bar stock. For this purpose, the base is cut cylindrical, leaving a square head 47 therebeyond, the base is threaded as at 48, bored through as at 49 and a transverse bore 50 of larger diameter is cut into the square head. The cross bar of the T fitting is preferably formed from circular stock and comprises a pair of separate socket plugs. Each of said plugs has a socket 51 tapped as at 52 with a reduced tapered shoulder 53 and a small cylindrical bore 54 through the inner end thereof. The plug is formed with a reduced shank 55, providing a shoulder 56 abutting against the square end of the stud, when the reduced shank is press-fitted into bore 50 thereof. The lengths of the shanks of the two identical lateral plugs are such as to leave a gap therebetween so that the lubricant admitted at one of the sockets may flow in part through the other and in part through the supporting post 46. The cylindrical post may, of course, mount a cylindrical flow controlling cartridge similar to that referred to in the embodiment of Figs. 5 and 6 and shown in my copending application previously referred to.

It will be seen that my fittings being wholly of bar stock which is drawn or rolled, are tough and uniformly dense and homogeneous in texture, not porous, spongy or brittle.

Subject-matter shown and described in the present application, but not claimed therein, is claimed in copending applications Serial No. 22,014, filed April 10, 1925, Serial No. 44,498, filed July 18, 1925, and Serial No. 492,507, filed October 31, 1930, said last mentioned application being a division of application Serial No. 44,498, previously referred to.

It is obvious that the fittings of the present application may also be made of other materials than bar stock, as for example of castings as previously described. It is also apparent that the threaded nipples of the embodiment of Figs. 3 and 4 could be employed in the embodiment of Figs. 1 and 2 and the tapped sockets of Figs. 1 and 2 could be employed in the embodiment of Figs. 3 and 4.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:—

1. An unflanged dividing fitting including a plurality of tapped pipe terminal sockets radiating inward from the periphery, said sockets having beveled shoulders of decreasing diameter inwardly at their inner ends for coaction with compression coupling sleeves, bores of smaller diameter beyond said shoulders radiating inward and intersecting at the center of the fitting, said fitting having a bore free from communication with said sockets, serving for mounting said fitting, one side of said fitting being flattened for disposition in face contact with the supporting structure without interference with the pipe terminal sockets and the pipe terminals attached thereto or obstructing the tightening or loosening thereof, said flattened face being traversed by the plane of said pipe terminal sockets.

2. An unflanged unitary dividing fitting, said fitting including a plurality of radial sockets for mounting pipe terminals, said sockets communicating at the axis of the stock, and a tapped socket in said fitting free from communication with said other sockets directed toward said axial point of communication and serving for mounting said fitting on a corresponding threaded stud or screw, said fitting being flattened for face contact with the supporting structure and said mounting socket extending inwardly from said flattened face toward the junction of said pipe terminal sockets.

3. An unflanged dividing fitting having a plurality of radial tapped sockets for mounting pipe terminals, said sockets having bores of reduced diameter and coaxial therewith and communicating with each other substantially at the axis of the fitting, and a radial tapped socket free from communication with said other sockets directed toward said axial point of communication and serving for mounting the said dividing fitting on a corresponding screw, said fitting being flattened for face contact with the supporting structure and said mounting socket extending inwardly from said flattened face toward the junction of said pipe terminal sockets.

4. An unflanged dividing fitting having an axial and a plurality of radial pipe terminal mounting conformations, said latter being substantially in a common plane, each of said conformations having a passage bored in the fitting, said passages communicating with each other substantially at the axis of the fitting, said fitting having socket means directed toward said axial point of communication free from communication with said bores and serving for mounting the same, said fitting being flattened for face contact with the supporting structure and said mounting socket extending inwardly from said flattened face toward the junction of said pipe terminal sockets.

5. An unflanged dividing fitting having an axial and a plurality of radial tapped sockets for mounting pipe terminals, said sockets communicating with each other at the axis of the fitting, said fitting having a bore therein perpendicular to and passing completely across said fitting from one side to the other thereof and across all of said sockets serving for mounting thereof, one side of said fitting being flattened for disposition in face contact with the supporting structure without interference with the pipe terminal sockets and the pipe terminals attached thereto or obstructing the tightening or loosening thereof, said flattened face being traversed by the plane of said pipe terminal sockets.

6. An unflanged dividing fitting comprising a short length of generally circular bar stock having a plurality of radial tapped sockets for mounting pipe terminals, said sockets communicating with each other at the axis of the fitting, said fitting having an axial hub tapped for mounting another pipe terminal and communicating with the other sockets and means for mounting said fitting upon a supporting structure perpendicular to and passing completely across said fitting from one side to the other thereof and across all of said sockets, said mounting means including a tapped socket extending toward the point of communication of said sockets.

7. A dividing fitting including a short unflanged body with cylindrical sockets therein communicating substantially at the axis of the element, and axially bored threaded nipples press fitted into said sockets, said body having a bore therein for maintaining the fitting upon a carrying structure and said nipples serving for mounting pipe terminals.

8. A dividing fitting including a short unflanged body with cylindrical radial sockets communicating substantially at the axis of the element and with a threaded bore extending through the fitting parallel to the axis thereof for mounting the same, and axially bored threaded nipples press fitted into said sockets for mounting pipe terminals.

9. A dividing fitting including a short unflanged body with cylindrical radiating sockets communicating by bores of reduced diameter substantially at the axis of the element, and axially bored threaded nipples press fitted into said socket for mounting pipe terminals, said fitting being of thickness greater than the diameter of the nipples and of the pipe terminals mounted thereon, whereby said fitting may be disposed in face contact with the supporting structure without interference with the nipples or terminals or obstructing the tightening or loosening thereto.

10. A dividing fitting of generally circular unflanged stock having a plurality of sockets for mounting the pipe terminal connections, said sockets having bores of reduced diameter and coaxial therewith and communicating with each other substantially at the axis of the fitting, and a transverse tapped socket free from communication with said other sockets and serving for mounting the said dividing fitting on a corresponding screw, said dividing fitting being provided with a flattened face into which said tapped socket projects.

11. A dividing fitting body of unflanged stock with an integral projecting circular hub portion formed by cutting away a part of said bar during the machining operation and including a plurality of radiating sockets radiating inward from the periphery toward a junction point in the middle of the fitting, said hub being also bored and threaded and by means of said bore communicating with said radiating sockets, said body being provided with a flattened face, and also including a bore extending inwardly into said body from said flattened face, said bore being bisected by the plane of said radiating sockets.

12. A hydraulic fitting comprising a short length of unflanged stock and including a unitary body devoid of mounting lugs therefor, having intersecting outwardly extending fluid bores, tapped cavities at the exposed ends of the several bores, said bores having conically shelved bottoms to provide fluid tight connections with separate supply and distributing tubes, said body having a clamping seat at one side thereof and a bolt opening extending transversely through said seat and substantially into said body and being free from communication with said fluid bores and cavities.

13. A hydraulic dividing fitting comprising a short length of unflanged stock having intersecting fluid passages therein and a plurality of screw threaded pipe connectors accessible from the exterior of the fitting and coaxial with the respective fluid passages, and adapted to provide fluid tight connection with supply and distributing tubes, said body having a bolt opening extending entirely through the thickness thereof at right angles to said fluid passages, in contiguity thereto, but free from communication therewith, the surface of said body at one end of said bolt hole being conformed as a clamping seat.

14. A relatively thin flat unflanged unitary integral dividing pipe fitting including a body having a plurality of tapped pipe terminal sockets radiating outwardly from the center of said fitting, said sockets having beveled shoulders at their inner ends for coaction with compression coupling sleeves, fluid conveying bores of smaller diameter beyond said shoulders axially aligned with said sockets, said bores meeting and intersecting substantially at the center of the fitting, said body also having a flattened clamping seat at one side thereof and a bolt opening extending transversely through said seat, said bolt opening being positioned away from and below said bores and being free of communication with said fluid conveying bores and sockets, the axes of said bores and sockets laying in a plane which substantially bisects said bolt opening.

15. A relatively thin flat unflanged unitary integral dividing pipe fitting including a body having a plurality of threaded pipe terminals radiating outwardly from the center of said fitting, said connections having bevelled shoulders at their ends for coaction with compression coupling sleeves, fluid conveying bores of smaller diameter beyond said shoulders axially aligned with said sockets, said bores meeting and intersecting substantially at the center of the fitting, the opposite sides of said body on either side of said connections being flattened to form clamping seats and a bolt opening extending transversely through said seat, said bolt opening being positioned away from and below said bores and being free of communication with said fluid conveying bores and connections, the axes of said bores and sockets laying in a plane which substantially bisects said bolt opening and is substantially parallel to and equidistant between said clamping seats.

Signed at New York city in the county of New York and State of New York this 15th day of June, A. D. 1925.

EDWARD H. KOCHER.